United States Patent [19]

Kussel et al.

[11] Patent Number: 4,874,335
[45] Date of Patent: Oct. 17, 1989

[54] CABLE ASSEMBLY FOR MINERAL MINING INSTALLATIONS

[75] Inventors: Willy Kussel, Werne; Reiner Frank, Sprockhövel, both of Fed. Rep. of Germany

[73] Assignee: Gewerkschaft Eisenhutte Westfalia GmbH, Lunen, Fed. Rep. of Germany

[21] Appl. No.: 212,378

[22] Filed: Jun. 27, 1988

[30] Foreign Application Priority Data

Jun. 27, 1987 [DE] Fed. Rep. of Germany ....... 3721304

[51] Int. Cl.⁴ .......................................... H01R 13/426
[52] U.S. Cl. .................................... 439/589; 439/175; 439/678
[58] Field of Search ................... 439/98, 181, 274–276, 439/312, 313, 502, 579, 583, 623, 679, 680, 589; 174/76, 77 R, 109

[56] References Cited

U.S. PATENT DOCUMENTS

| | | | |
|---|---|---|---|
| 913,595 | 2/1909 | Weinhauer | 439/462 |
| 2,963,536 | 12/1960 | Kokalas | 174/77 R |
| 3,015,794 | 1/1962 | Kishbaugh | 174/77 R X |
| 3,271,726 | 9/1966 | Pfendler | 439/276 X |
| 3,816,641 | 6/1974 | Iversen | 174/77 R X |
| 4,264,116 | 4/1981 | Gliha, Jr. | 439/680 X |
| 4,305,638 | 12/1981 | Hutter | 439/583 |
| 4,427,256 | 1/1984 | Reif et al. | 439/181 X |
| 4,477,132 | 10/1984 | Moser et al. | 439/312 X |
| 4,727,222 | 2/1988 | Sato | 174/109 X |

Primary Examiner—Desmond, Eugene F.
Attorney, Agent, or Firm—Sughrue, Mion, Zinn

[57] ABSTRACT

A cable assembly for use in electro-hydraulic control systems of mineral mining installations is composed of a cable with a plurality of electrical wires encased in a multi-layered armoured sheath and connectors at the ends of the cable. The cable is bonded to sealing bodies which fit in the connectors. The connectors are one-piece components each with a sleeve for coupling to the cable and a plug which fits into a socket of a complementary connector. The sealing bodies locate in the sleeves of the connectors and the wires pass through the sealing bodies to join with contacts supported by carriers in the plugs of the connectors. A screw-threaded ring clamps the cable to the sleeve of each connector.

5 Claims, 2 Drawing Sheets

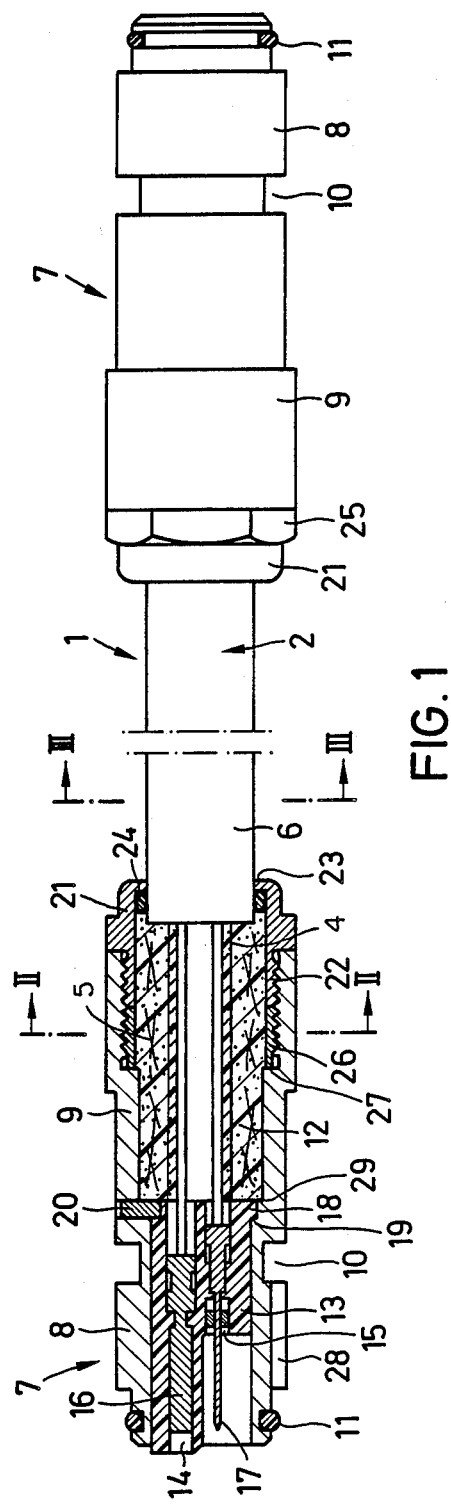
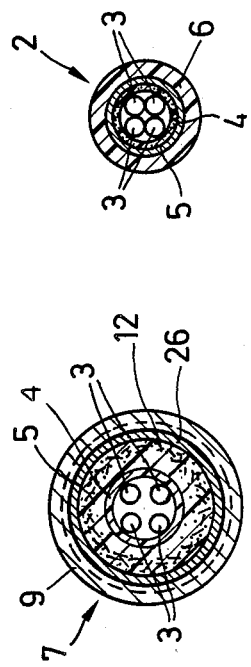
FIG. 1
FIG. 2
FIG. 3

CABLE ASSEMBLY FOR MINERAL MINING INSTALLATIONS

TECHNICAL FIELD OF THE INVENTION

The present invention relates to a multi-core electrical cable assembly for use in electro-hydraulic control systems for mineral mining installations.

BACKGROUND TO THE INVENTION

It is well known in underground mine workings to employ low power electrical cables and connectors which have to be very rugged to cope with the harsh conditions. To protect the electrical wires of such cables it is known from German Utility Model No. 84 357 43.6 and GB No. 2072792 to use a cable assembly in which the wires are encased in an hydraulic hose equipped at its ends with standard hose couplings. These couplings take the form of plug-in connectors which mate within sockets of complementary connectors. Locking devices such as pins or U-shaped clamping pieces are used to fix the mating connectors together. The connectors contain contact carriers with electrical contact elements which mate together when the connectors are brought together in the correct orientation.

The production of known cable assemblies for mining is comparatively expensive not the least because the connectors are made from numerous parts which are produced separately and then assembled. The protective hydraulic hose typically employs a two-layered armoured reinforcement with an embedded steel braiding and is an expensive item. Conventional hoses of this kind are designed to withstand high pressures and to have a certain amount of flexibility. When subjected to tensile force the hose tends to stretch by about 10% and to permit such stretching without damaging the electric wires the latter have to be somewhat longer than is desired.

A general object of the invention is to provide a low current cable assembly which has a simplified construction and is economic to produce.

A further object of the invention is to provide a cable assembly which is able to withstand considerable tensile force without damaging the electrical wires.

BRIEF SUMMARY OF THE INVENTION

According to the invention there is provided a multi-core electrical cable assembly for use in electro-hydraulic control systems for mineral mining installations; said cable assembly comprising a flexible cable composed of a multi-layered sheath including a metallic armoured layer surrounding a plurality of electrical conductors; connectors provided on the ends of the cable; at least one of the connectors having a cylindrical plug portion for mating with a socket of a complementary connector, a cylindrical sleeve portion for receiving the cable, a sealing body provided within the sleeve portion through which the conductors of the cable extend and into which at least some of the sheath layers of the cable extend and are bonded, a carrier with electrical contacts connected to the conductors provided in the plug portion and means for detachably securing the sleeve portion to the exterior of the cable.

The electrical conductors or wires are usually tightly enclosed in the protective sheath and extend through the sealing body to project therefrom and connect with the contacts supported by the contact carrier. The detachable securing means is conveniently a screw-threaded ring which fits with a screw-threaded region of the sleeve portion of the connector.

The connectors on the ends of the cable may be identical. The connectors can each have the plug portion and the sleeve portion formed as a one-piece component conveniently turned on a lathe. The sleeve portion accommodates the sealing body and the latter is secured in position as by the screw-threaded ring so it resists tension but is easily detachable. The fitting of the connector to the cable is also simplified by these measures. When the screw-threaded ring is released the plug and sleeve portions of the connector i.e. the outer component, can be slipped off the sealing body and the contact carrier. Although the contact carrier can be united with the sealing body the carrier is preferably separate and locked against rotation by a locking element such as a pin or the like which fits in the plug portion of the connector. This locking element also needs to be released before the outer components of the connector can be fully released.

The sheath enclosing the conductors preferably has inner and outer plastics insulation layers with the metallic armoured layer in the form of a braided structure therebetween. The conductors themselves may be encased in plastics insulation with conductors held snugly side-by-side within the inner sheath layer. The braided structure in particular is designed so that overall the sheath undergoes limited extension when subjected to considerable tensile force. An extension of under 10% is considered desirable. The inner layer and the armoured layer preferably extend to substantial extent into the sealing body while the outer layer extends just partly into the sealing body. The bonding of the sheath with the sealing body provides a tension resistant coupling between the toughened sheath and the connector so that stress in the more fragile conductors is avoided.

The sealing body is larger in diameter than the cable and the screw-threaded ring acting as a closure piece may have an inturned lip or flange pressing on the exterior of the sheath and acting as a stop for the sealing body. It is desirable to also provide a sealing ring such as an 0-ring on the sheath which abuts on the flange of the closure piece.

A spacer/centering ring can be provided in the sleeve portion of the connector to surround the sealing body and be urged against a shoulder in the sleeve portion by the closure piece. The contact carrier can then rest against the sealing body and a collar or the like on the inner end of the carrier may rest against a shoulder of the sleeve portion.

The contacts may be formed as plug pins and sockets disposed in a symmetrical fashion to mate with the appropriate contacts of the complementary connector.

The cable assembly in accordance with the invention can be used as a standard component throughout an electro-hydraulic control system in a mine working. To avoid misorientation, and to ensure the cable assembly is only used with compatible complementary connectors, a mechanical coding system is best employed as by axial slots and ribs or similar mating projections and recesses on the connectors intended to be joined together.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 1 is part sectional side view of a cable assembly constructed in accordance with the invention;

FIG. 2 is a cross-section of the cable assembly taken along the line II—II of FIG. 1;

FIG. 3 is a cross-section of the cable assembly taken along the line III—III of FIG. 1.

DESCRIPTION OF PREFERRED EMBODIMENT

Figure 4:
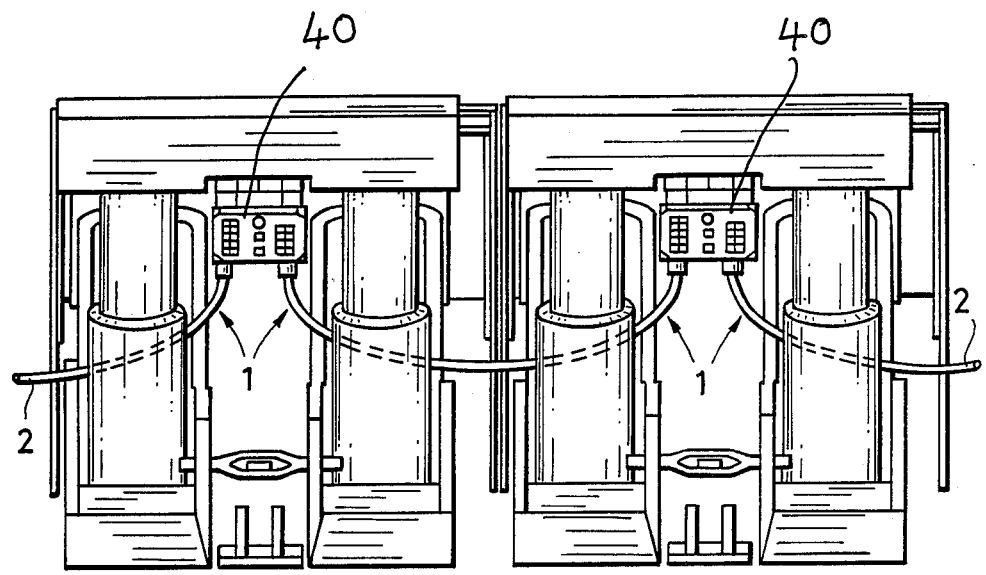
FIG. 4 depicts roof supports of a mineral mining installation employing cable assemblies in accordance with the invention.

As shown in FIGS. 1 to 3, a cable assembly is composed of a multi-core cable 1 with connectors 7 at its ends. The individual electrical wires or conductors 3 of the cable 1, here four in number, carry low electrical currents. The conductors 3 are themselves composed of a central metallic core with an insulated coating and the conductors 3 are contained in a multi-layer sheath 2. The sheath 2 has an inner layer 4 made from a flexible insulating plastics material which snugly surrounds the conductors 3. An intermediate armoured layer 5 surrounds the layer 4 and an outer layer 6 of insulating plastics surrounds the layer 5. The intermediate layer 5 is composed of a metallic, e.g. steel, braiding structure and is designed to withstand tensile force with only slight elongation generally less than 10% of the length of the cable 1.

The connectors 7 at the ends of the cable 1 are identical. Each connector 7 has a turned one-piece metal component providing a plug portion 8 and a coupling sleeve portion 9. Each connector 7 is intended to mate with a complementary connector (not shown) provided with a socket for receiving the plug 8. The plug 8 is provided with peripheral grooves one of which receives an 0-ring 11 while the other groove 10 receives a U-shaped clamping piece (not shown) for fastening the complementary connectors together. Other forms of locking devices used to fasten the connectors together can also be employed especially locking devices as are well known in the mining appliance art and particularly for hydraulic connectors. The 0-ring 11 is intended to sealably contact the interior of the socket of the mating complementary connector to seal off the interior of the connector 7.

The ends of the cable 1 are each terminated with a cylindrical sealing body 12 which firmly binds the conductors 3. The sealing bodies 12 are preferably made from a plastics moulding. Each sealing body 12 is shaped to fit into a stepped profile inside the sleeve 9 and has a larger diameter than the cable 1. As shown in FIG. 1, the outer cable layer 6 is cut back so that only small end regions project into the bodies 12. The layers 5 and 4 however substantially pass through the bodies 12 or terminate near their outer ends. The conductors 3 pass through the bodies 12 to project from their outer ends. The interior of the plug 8 of each connector 7 is smaller than the interior of the sleeve 9 and the body 12. This creates a shoulder 29 against which the body 12 rests. Within each connector 7 there is a contact carrier 13 which lies mainly within the plug 8. The carriers 13 are also made from plastics material.

Each carrier 13 has through bores 14, 15 containing metallic contacts 16, 17 with which the individual conductors 3 are electrically connected. The contacts 17 take the form of plug pins while the contacts 16 take the form of socket sleeves. The contacts 16 lie on one side of a vertical longitudinal central plane of the cable assembly while the contacts 17 lie on the opposite side of this plane in a symmetrical disposition. The complementary connectors which mate with the connectors 7 are likewise provided with socket sleeves and plug pins which mate with the contacts 17, 16 respectively. Each connector 7 has an axial slot 28 which receives a rib or the like on the complementary connector to ensure the connectors can only be mated together in the correct orientation.

The carriers 13 each have a flange 18 at its inner end which engages in a recess in the sleeve 9 of the associated connector 7 to secure the carrier in position. A removable pin 20 which may be screw-threaded engages in a radial bore of each sleeve 9 to project into a recess in the carrier 13 to prevent the carrier 13 from rotating.

A closure piece in the form of a screw-threaded ring 21 with a hexagonal outer configuration is used to secure the cable 1 to each connector 7. The cable 1 passes through the rings 21 which have screw-threaded regions 22 engaging with internal screw-threaded portions of the sleeves 9. Each ring 21 has an inturned flange 23 which projects and presses on the outer cable layer 6 to prevent the associated sealing body 12 from being pulled out of the sleeve 9. 0-rings 24 fit tightly on the cable 1 and abut on the flanges 23. The sleeves 9 of each of the connectors 7 contains a locating/centering ring 26 which is held against a shoulder 27 in the sleeve 9 by the end of the screw-threaded ring 21. The ring 21 tightly surrounds the body 12 and has a stabilizing effect on the latter.

To release the connectors 7 from the cable 1 it is only necessary to unscrew the rings 21 and release the pins 20. The connectors 7 can then be drawn off from the outer end of the carriers 13.

FIG. 4 depicts a pair of adjacent roof supports of a mineral mining installation. The roof supports are equipped with control units 40 of an electro-hydraulic control system and cable assemblies as described interconnect the units 40 as shown with the connectors 7 fitting into complementary connections on the units 40.

We claim:

1. A multi-core electrical cable assembly for use in electro-hydraulic control systems for mineral mining installations; said cable assembly comprising:

a flexible cable (1) composed of a multi-layered sheath surrounding a plurality of electrical conductors (3); said sheath including an inner plastics insulation layer (4) snugly fitting around the conductors, a braided metallic armoured intermediate layer (5) surrounding the inner layer, and an outer plastics insulation layer (6) surrounding the intermediate layer; a connector (7) provided on one of the ends of the cable; said connector comprising a one-piece cylindrical component defining a plug portion (8) with an interior surface and an exterior surface for mating with a socket of a complementary connector, and a screw-threaded sleeve portion (9) having a stepped interior bore surface larger than the interior surface of the plug portion to provide a shoulder (19) therebetween; a plastics sealing body with a stepped exterior disposed within the stepped bore surface to lock within the sleeve portion, said sealing body serving to receive and bond-in an end region of said one end of the cable with the conductors of the cables extending through the sealing body, and the inner and intermediate layers of the cable extending substantially through the sealing body; a plastics carrier (13) with through bars (14, 15) containing electrical plug and socket forming contacts (16, 17) terminating the conductors within the plug portion; the carrier having a flange (18) which fits into the sleeve portion to lock the carrier in the connector and prevent withdrawal from the connector in a direction opposite to the cable;

releasable means (20) for restraining rotation of the contact carrier within the connector;

a screw-threaded locking ring (21) engaging within the sleeve portion, the screw-threaded ring having a flange (23);

a sealing ring (24) tightly surrounding the outer layer of the cable and abutting the flange of the locking ring to secure the cable exterior to the connector;

means (28) on the plug portion for locating the connector in the correct orientation with respect to the complementary connector; and means (10) on the plug portion for cooperating with a releasable clamping device for detachably securing the connector to the complementary connector.

2. A cable assembly according to claim 1, wherein identical connectors are provided on the ends of the cable.

3. A cable assembly according to claim 1, wherein the conductors take the form of wires each encased in a plastics insulation and held snugly within the inner layer of the sheath.

4. A cable assembly according to claim 1, wherein the sleeve portion of the connector contains a ring surrounding the sealing body which is secured by the screw-threaded ring against a shoulder in the sleeve portion.

5. A cable assembly according to claim 1, wherein the plug portion has a peripheral groove into which a locking device can be engaged to secure the connector to the complementary connector.

* * * * *